US012040580B2

(12) United States Patent
Ding

(10) Patent No.: US 12,040,580 B2
(45) Date of Patent: Jul. 16, 2024

(54) OPERABLE WIRE CONNECTOR

(71) Applicant: Ningbo Degson Electrical Co., Ltd., Cixi (CN)

(72) Inventor: Gaosong Ding, Cixi (CN)

(73) Assignee: Ningbo Degson Electrical Co., Ltd., Cixi (CN)

( * ) Notice: Subject to any disclaimer, the term of this patent is extended or adjusted under 35 U.S.C. 154(b) by 333 days.

(21) Appl. No.: 17/635,083

(22) PCT Filed: Nov. 4, 2019

(86) PCT No.: PCT/CN2019/115322
§ 371 (c)(1),
(2) Date: Feb. 14, 2022

(87) PCT Pub. No.: WO2021/056684
PCT Pub. Date: Apr. 1, 2021

(65) Prior Publication Data

US 2022/0294130 A1 Sep. 15, 2022

(30) Foreign Application Priority Data

Sep. 27, 2019 (CN) ......................... 201910922581.7

(51) Int. Cl.
*H01R 4/48* (2006.01)

(52) U.S. Cl.
CPC ......... *H01R 4/48365* (2023.08); *H01R 4/483* (2023.08); *H01R 4/4828* (2023.08)

(58) Field of Classification Search
CPC ...... H01R 4/48; H01R 4/4809; H01R 4/4811; H01R 4/4816; H01R 4/48185; H01R 4/4828; H01R 4/4819; H01R 4/483; H01R 4/48365; H01R 4/48455
See application file for complete search history.

(56) References Cited

U.S. PATENT DOCUMENTS

| | | | | |
|---|---|---|---|---|
| 8,388,387 | B2 * | 3/2013 | Koellmann ........ | H01R 4/48455 439/729 |
| 9,397,444 | B1 * | 7/2016 | Wu .................... | H01R 4/48455 |
| 10,193,245 | B2 * | 1/2019 | Lorenschat ........ | H01R 4/48455 |
| 10,230,179 | B2 * | 3/2019 | Wilinski .............. | H01R 9/2416 |
| 10,367,272 | B2 * | 7/2019 | Witte ................. | H01R 4/48365 |
| 11,289,831 | B2 * | 3/2022 | Hartmann ............ | H01R 9/2416 |
| 11,444,392 | B2 * | 9/2022 | Tuerkekoele ...... | H01R 4/48365 |

* cited by examiner

*Primary Examiner* — Renee S Luebke
*Assistant Examiner* — Paul D Baillargeon
(74) *Attorney, Agent, or Firm* — Wang Law Firm, Inc.

(57) ABSTRACT

An operable wire connector comprises an insulating housing (1), an operating handle (2) rotatably mounted inside the insulating housing (1), a transmitting piece (3), an electric conductor (4), an elastic clamping piece (5) with a fixed portion (51) connected to the electric conductor (4) and an elastic free portion (52) resisted by the transmitting piece (3), and a cover (6) assembled with the insulating housing (1); an adjustable gap is formed between the elastic free portion (52) and the electric conductor (4) for receiving a wire, and the gap will continuously be present due to the action of a rotation limiting portion (12). The operating handle (2) is pulled reversely, so that the wire comes into contact with the electric conductor (4); when the user pulls and turns up the operating handle (2) again, there is no need to continuously use force, and the wire will be take out easily.

9 Claims, 13 Drawing Sheets

OPERABLE WIRE CONNECTOR

TECHNICAL FIELD OF THE INVENTION

The present invention relates to the technical field of wire connectors, and in particular to an operable wire connector.

BACKGROUND OF THE INVENTION

As common products in the field of electrical connectors, wire connectors play an important role in fastening, connecting and current carrying. The existing wire connectors mostly adopt a clamp structure. Such wire connectors mainly comprise an insulating housing, an operation button, an electric contact element and a wire clamping connector. The insulating housing has a wire access hole for receiving an external wire to be introduced, and the electric contact element has a wire passage for accommodating the wire. The electric contact element is electrically connected to the wire clamping connector.

When it is necessary to introduce an external wire into such a wire connector, a user needs to presses down the operation button, and the operation button opens the wire clamping connector to reserve a gap for receiving the wire. After the wire is inserted into the gap, the user releases the press force on the operation button, so that the wire at the gap can be clamped by means of the elastic restoring force of the wire clamping connector, thereby realizing the electrical connection between the wire and the electric contact element and completing the wiring operation of the wire connector.

However, when it is necessary to insert the wire into such a wire connector, the existing wire connectors have some disadvantages. The user needs to always apply a force to the operation button of the wire connector to ensure that there is always a formed gap for receiving the wire, so that the wire can be inserted into the gap. In addition, if the user needs to take out the wire, the user also needs to continuously apply a force to the operation button to ensure the presence of the gap, and then takes out the wire in the wire connector. In this way, for the operation of introducing or taking out a wire, the user needs to continuously apply a force to the operation button, so that the complexity of connecting and taking out a wire of the wire connector is increased undoubtedly.

SUMMARY OF THE INVENTION

It is an object of the present invention to provide an operable wire connector.

For achieving the object, the operable wire connector comprises an insulating housing having a wire access hole and a chamber in communication with the wire access hole;

an operating handle mounted on the insulating housing, having a head end and a tail end;

a transmitting piece placed under the operating handle;

an electric conductor placed under the transmitting piece;

an elastic clamping piece mounted inside the chamber, with an elastic free portion and a fixed portion; the head end of the operating handle extends outside the chamber and the tail end of the operating handle is rotatably mounted inside the insulating housing; the transmitting piece has a force applying portion and a force bearing portion pressing against the tail end of the operating handle; the fixed portion of the elastic clamping piece is connected to the electric conductor, and the force applying portion of the transmitting piece resists against the elastic free portion; and an adjustable gap is formed between the elastic free portion and the electric conductor, for receiving a wire passing through the wire access hole;

a cover assembled with the insulating housing forming the chamber.

Preferably, in the operable wire connector, the electric conductor has an upper plate for contacting the wire, and a connecting portion protruding upward from the upper plate; the transmitting piece has a limiting hole defined on the force bearing portion for receiving the connecting portion, the transmitting piece covers the upper plate, the upper plate is located under the force bearing portion, and the connecting portion extends through the limiting hole.

Preferably, the operating handle has an electric test hole defined on the upper plate, for receiving an electric test tool to pass through to touch the surface of the upper plate.

Preferably, in the operable wire connector, the insulating housing has a rotation limiting portion for limiting the rotation angle of the tail end of the operating handle, and the rotation limiting portion is formed by a vertical sidewall formed on the insulating housing and an inclined wall connected to the vertical sidewall.

As another structural form of realizing the rotation limiting portion, preferably, in the operable wire connector, the insulating housing has a groove as a rotation limiting portion for limiting the rotation angle of the tail end of the operating handle; the rotation limiting portion comprises a groove bottom and an inclined wall connected to the groove bottom; the operating handle has a rotating portion at the tail end, and the rotating portion is capable of rotating inside the rotation limiting portion along with the rotation of the tail end of the operating handle.

Preferably, in the operable wire connector, a rotating shaft is attached to the insulating housing and located above the chamber; a rotating shaft hole for receiving the rotating shaft is defined at the tail end of the operating handle, and the tail end of the operating handle is rotatably connected to the insulating housing by inserting the rotating shaft into the rotating shaft hole.

Preferably, in the operable wire connector, the transmitting piece has a transmitting body, the force bearing portion is connected to top of the transmitting body; the transmitting piece has at least one bending arm extends downwardly from the top of the transmitting body, and the force applying portion is formed on the bending arm.

Preferably, the transmitting piece has an limiting hole that is rotatably mounted on the connecting portion of the electric conductor.

Preferably, the elastic free portion of the elastic clamping piece comprises at least one support edge disposed on the elastic free portion, and at least one wire clamping edge disposed at an end of the elastic free portion;

the force applying portion of the transmitting piece rests against the support edge;

the wire clamping edge allows a wire inserting through the wire access hole to resist against the electric conductor, the fixed portion and the elastic free portion of the elastic clamping piece is connected together through a bent transition portion.

Optionally, the support edge is an edge having a planar cross-section or a bent edge formed by the elastic free portion.

Preferably, in the operable wire connector, the force bearing portion of the transmitting piece has a resisting end, the wire is capable of resisting against the upper plate of the electric conductor, and the resisting end resists against the upper plate of the electric conductor during rotation.

Preferably, in the operable wire connector, the fixed portion of the elastic clamping piece is fixed to the electric conductor through a plurality of concave and convex structures which are matched with each other.

Preferably, the elastic free portion of the elastic clamping piece is resisted against the electric conductor to form an included angle.

Compared with the prior art, the present invention has the following advantages.

Firstly, in the wire connector of the present invention, an operating handle is disposed on the insulating housing with a chamber, the head end of the operating handle extends outside the chamber and the tail end of the operating handle is rotatably mounted inside the insulating housing, and the insulating housing has a rotation limiting portion for limiting the rotation angle of the tail end of the operating handle. In addition, a transmitting piece, an electric conductor and an elastic clamping piece are further disposed in the chamber of the insulating housing. The operating handle can apply a force to the transduction piece, and the transduction piece can apply a downward pressing force to the elastic clamping piece. Thus, when it is necessary to perform wiring, after a user pulls and turns up the operating handle, the operating handle applies a pressing force to the transduction piece, and then transduction piece presses the elastic free portion of the elastic clamping piece downward, so that the elastic free portion is pressed down, and an adjustable gap is formed between the elastic free portion and the electric conductor, for receiving a wire passing through the wire access hole. The operating handle is pulled reversely, the elastic free portion of the elastic clamping piece is returned to the original state, and the elastic free portion will apply a force to the wire, so that the wire comes into contact with the electric conductor. When it is necessary to pull the wire out, the user pulls and turns up the operating handle again, so that a gap is formed again between the elastic free portion of the elastic clamping piece and the electric conductor. Thus, the wire can be taken out toward the outer side of the wire access hole.

Secondly, a rotation limiting portion for limiting the angle of rotation of the tail end of the operating handle is disposed on the insulating housing, so that the operating handle is pulled and rotated to the angle defined by the rotation limiting portion. At this time, the rotation limiting portion can limit the tail end of the operating handle, so that the operating handle is not easy to rotate, and the gap can exist continuously, avoiding the defect of the conventional wire connectors that the wire can be introduced or taken out only when the user continuously applies a force to the operation button.

DETAILED DESCRIPTION OF THE INVENTION

Figure 1:
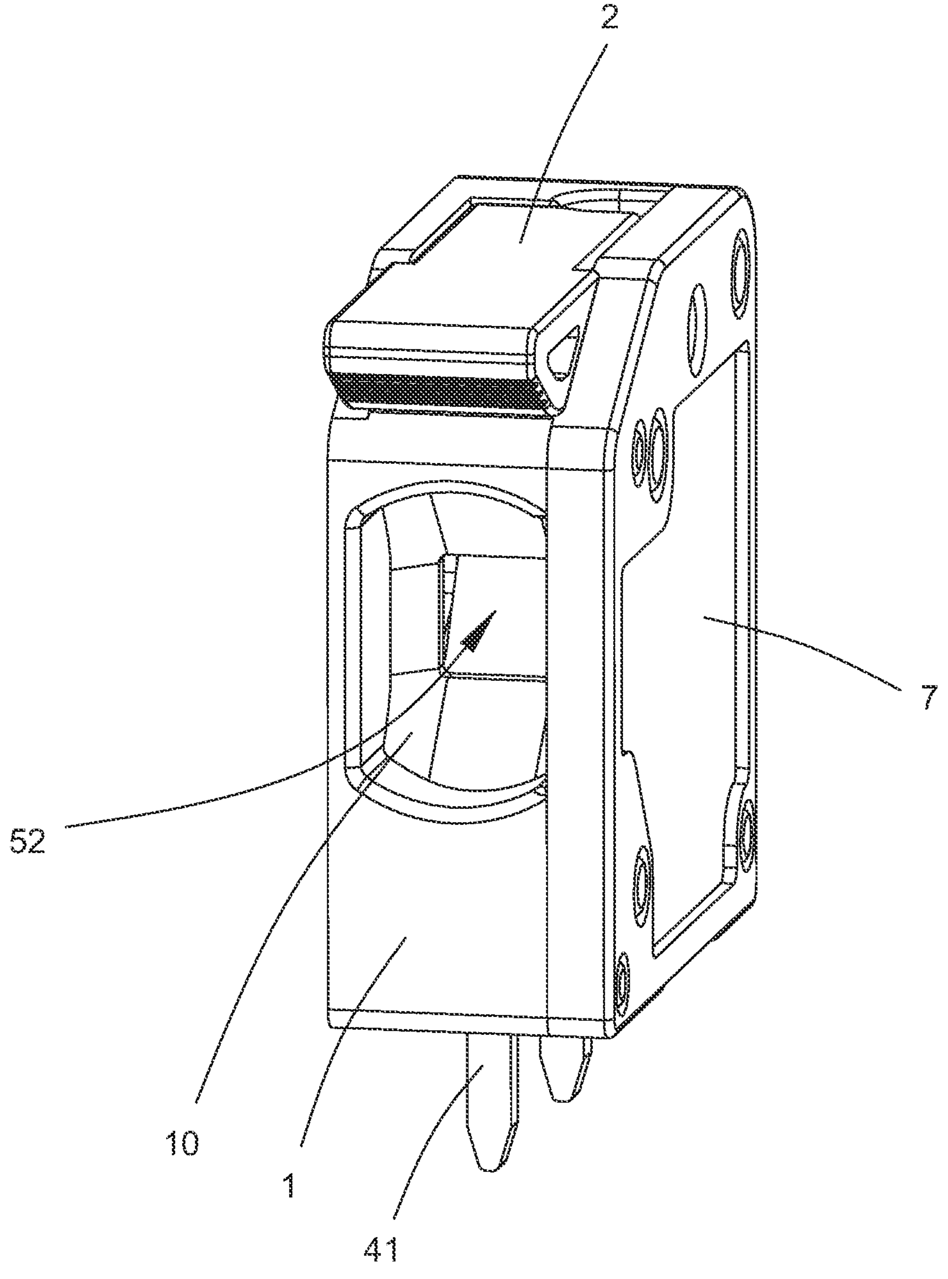
FIG. 1 is a perspective view of an operable wire connector according to Embodiment 1 of the present invention.

The present invention will be further described in detail below by embodiments with reference to the accompanying drawings.

Embodiment 1

As shown in FIGS. 1-6, a first preferred embodiment of an operable wire connector of the present invention is shown. The wire connector comprises an insulating housing 1, an operating handle 2 with a head end 21 and a tail end 22, a transmitting piece 3, an electric conductor 4, an elastic clamping piece 5 and a cover 6.

The insulating housing 1 has a wire access hole 10 and a chamber 11 in communication with the wire access hole 10.

The head end 21 of the operating handle 2 extends outside the chamber 11 and a tail end 22 of the operating handle 2 is rotatably mounted inside the insulating housing 1. The insulating housing 1 has a rotation limiting portion 12 for limiting the rotation angle of the tail end 22 of the operating handle 2. The rotation limiting portion 12 can keep the operating handle 2 in a standstill state at the corresponding angle during its rotation. For example, here, the angle defined by the rotation limiting portion 12 is that the angle of rotation of the tail end 22 of the operating handle 2 is 90°.

Figure 2:
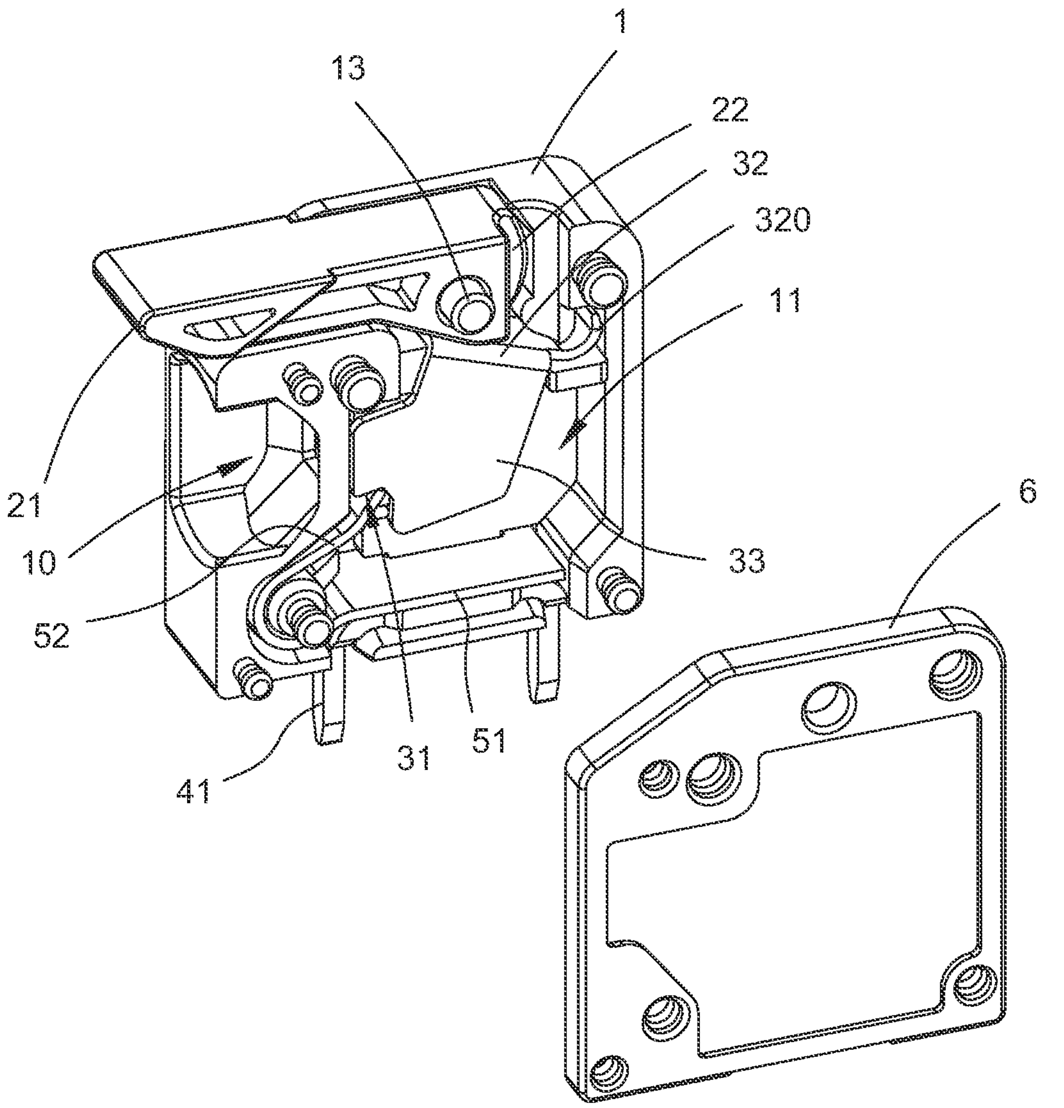
FIG. 2 is a perspective view of the wire connector in FIG. 1 when a cover is removed.
Figure 3:
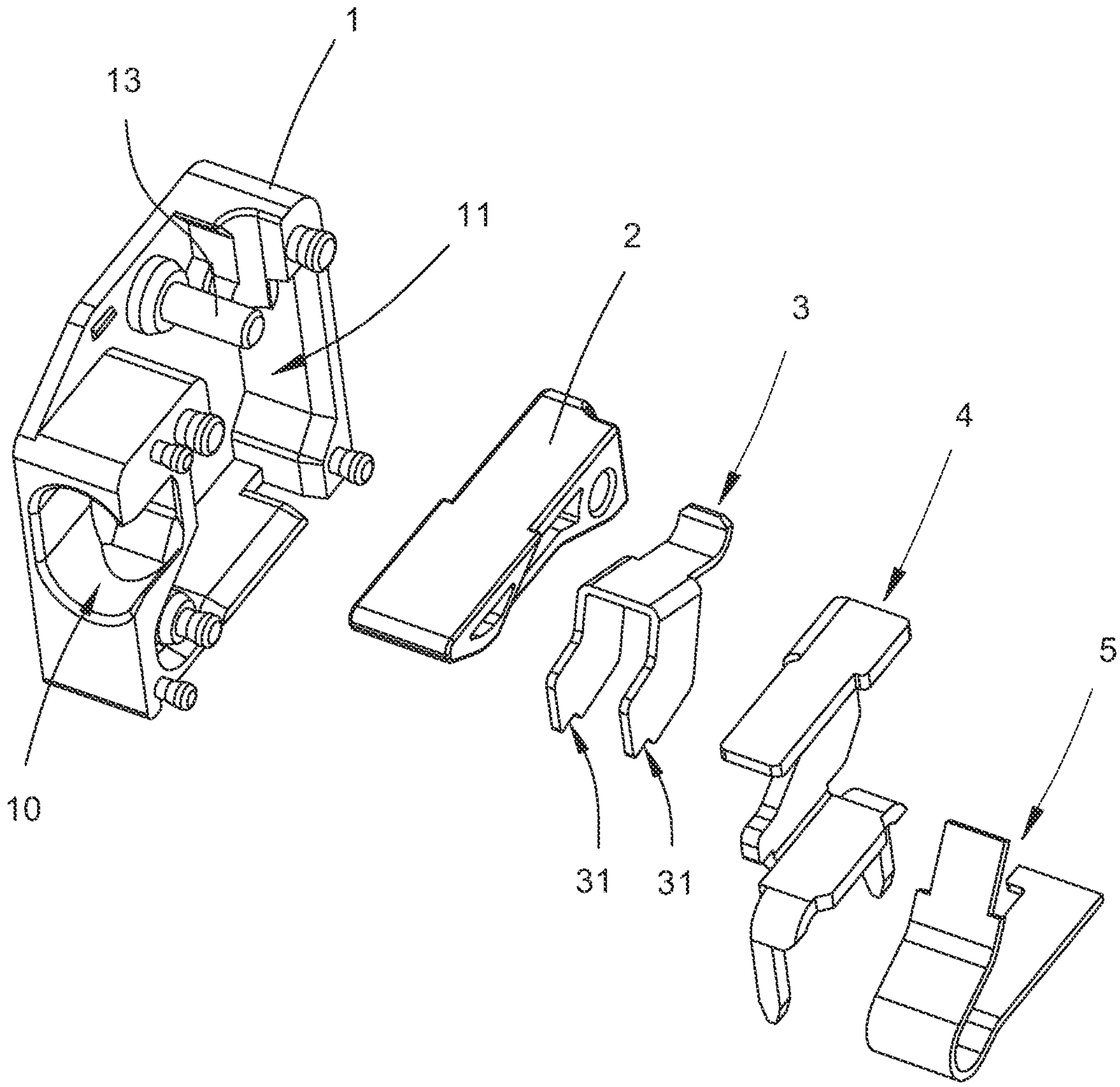
FIG. 3 is an exploded view of the wire connector in FIG. 2 (after the cover is removed)
Figure 4:
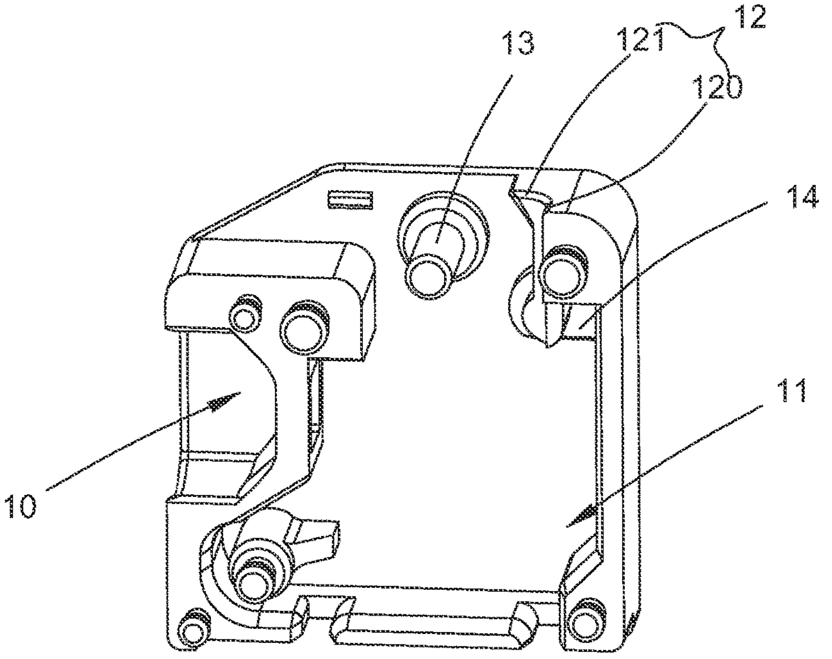
FIG. 4 is a perspective view of an insulating housing according to Embodiment 1 of the present invention.
Figure 5:
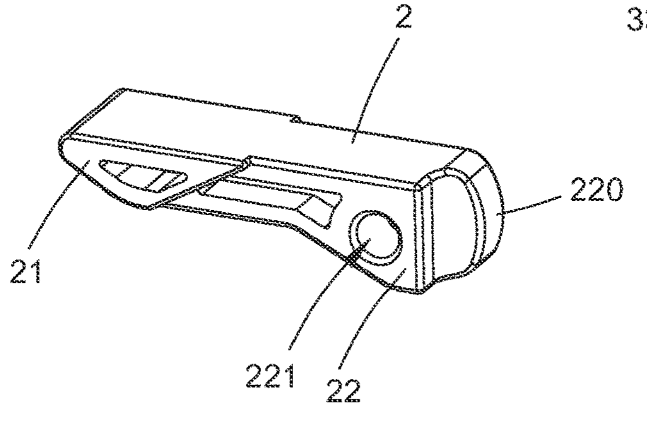
FIG. 5 is a perspective view of an operating handle according to Embodiment 1 of the present invention.

In this embodiment, as shown in FIGS. 2, 4 and 5, a rotating shaft 13 is attached to the insulating housing 1 and located above the chamber 11; a rotating shaft hole 221 for receiving the rotating shaft 13 is defined at the tail end 22 of the operating handle 2, and the tail end 22 of the operating handle 2 is rotatably connected to the insulating housing 1 by inserting the rotating shaft 13 into the rotating shaft hole 221. By arranging the operating handle 2 on the insulating housing 1 in such a way, it can be convenient for the user to pull and turn up the operating handle 2.

The transmitting piece 3 is mounted inside the chamber 11 and placed under the operating handle 2, the transmitting piece 3 has a force applying portion 31 and a force bearing portion 32 pressing against the tail end 22 of the operating handle 2. Here, the transmitting piece 3 functions to transfer the force at the tail end 22 of the operating handle 2 to the subsequent elastic clamping piece 5, ensuring that the elastic clamping piece 5 can be deformed under stress with the upward rotation of the operating handle 2 or restored to the original state with the downward rotation of the operating handle 2.

The electric conductor 4 is mounted inside the chamber 11 and placed under the transmitting piece 3. In this embodiment, the electric conductor 4 may have a pin 41 located outside the insulating housing 1. Of course, as another structural form of the electric conductor 4, the electric conductor 4 may have a plug-in end matched with the insertion of an external product. For example, here, the plug-in end may be a female plug or a male plug.

The elastic clamping piece 5 is mounted inside the chamber 11, with an elastic free portion 52 and a fixed portion 51; the fixed portion 51 of the elastic clamping piece 5 is connected to the electric conductor 4, and the force applying portion 31 of the transmitting piece 3 resists against the elastic free portion 52; and an adjustable gap is formed between the elastic free portion 52 and the electric conductor 4, for receiving a wire passing through the wire access hole 10. As for the fixation mode for the fixed portion 51 and the electric conductor 4, the electric conductor may have an adaptation portion adapted to the fixation of the fixed portion 51 of the elastic clamping piece 5. For example, the fixed portion 51 of the elastic clamping piece 5 is fixed to the electric conductor 4 though concave and convex structures which are matched with each other. For example, the adaptation portion on the electric conductor 4 may be a groove for receiving the fixed portion 51, and the elastic free portion 52 of the elastic clamping piece 5 is resisted against the electric conductor 4 to form an included angle.

The cover 6 is assembled with the insulating housing 1 forming the chamber 11. The cover 6 and the insulating housing 1 are preferably assembled in a detachable manner. For example, the cover 6 and the insulating housing 1 may be assembled through fastening structures or bolt fixation structures which are matched with each other.

Figure 10:
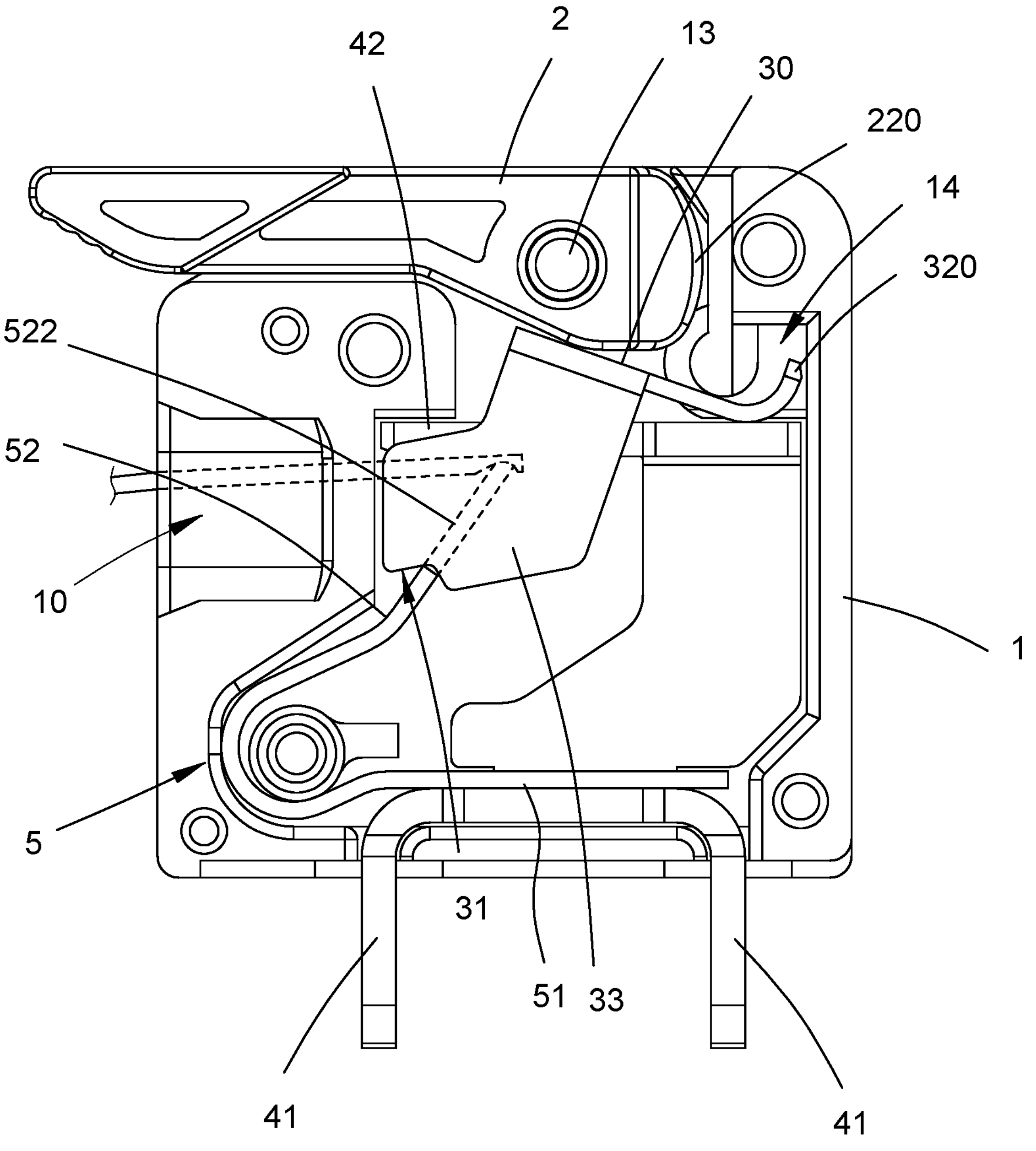
FIG. 10 is a perspective view of the wire connector according to Embodiment 1 of the present invention when the operating handle is not pulled and turned up.
Figure 11:
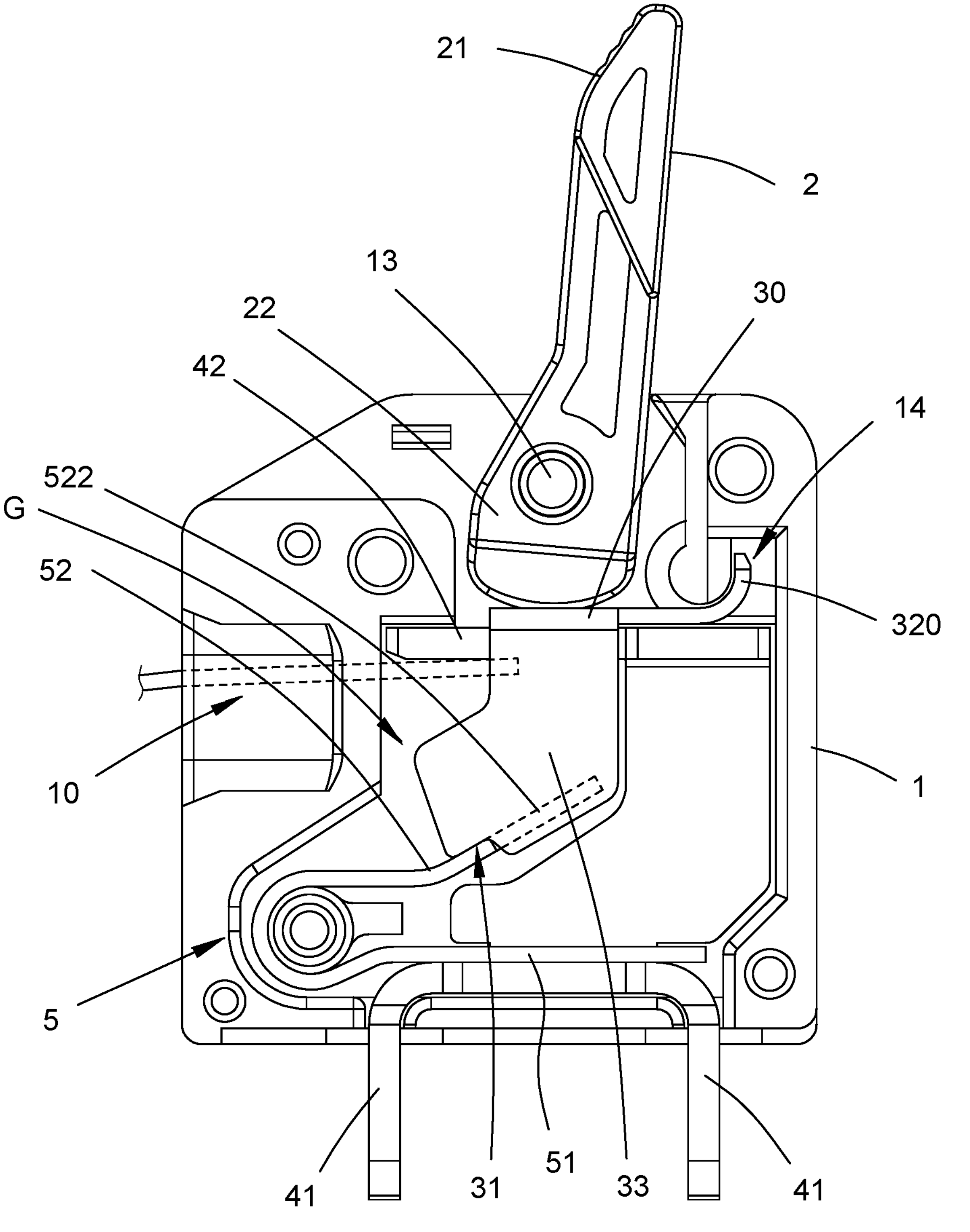
FIG. 11 is a perspective view of the wire connector according to Embodiment 1 of the present invention when the operating handle is pulled and turned up.
Figure 12:
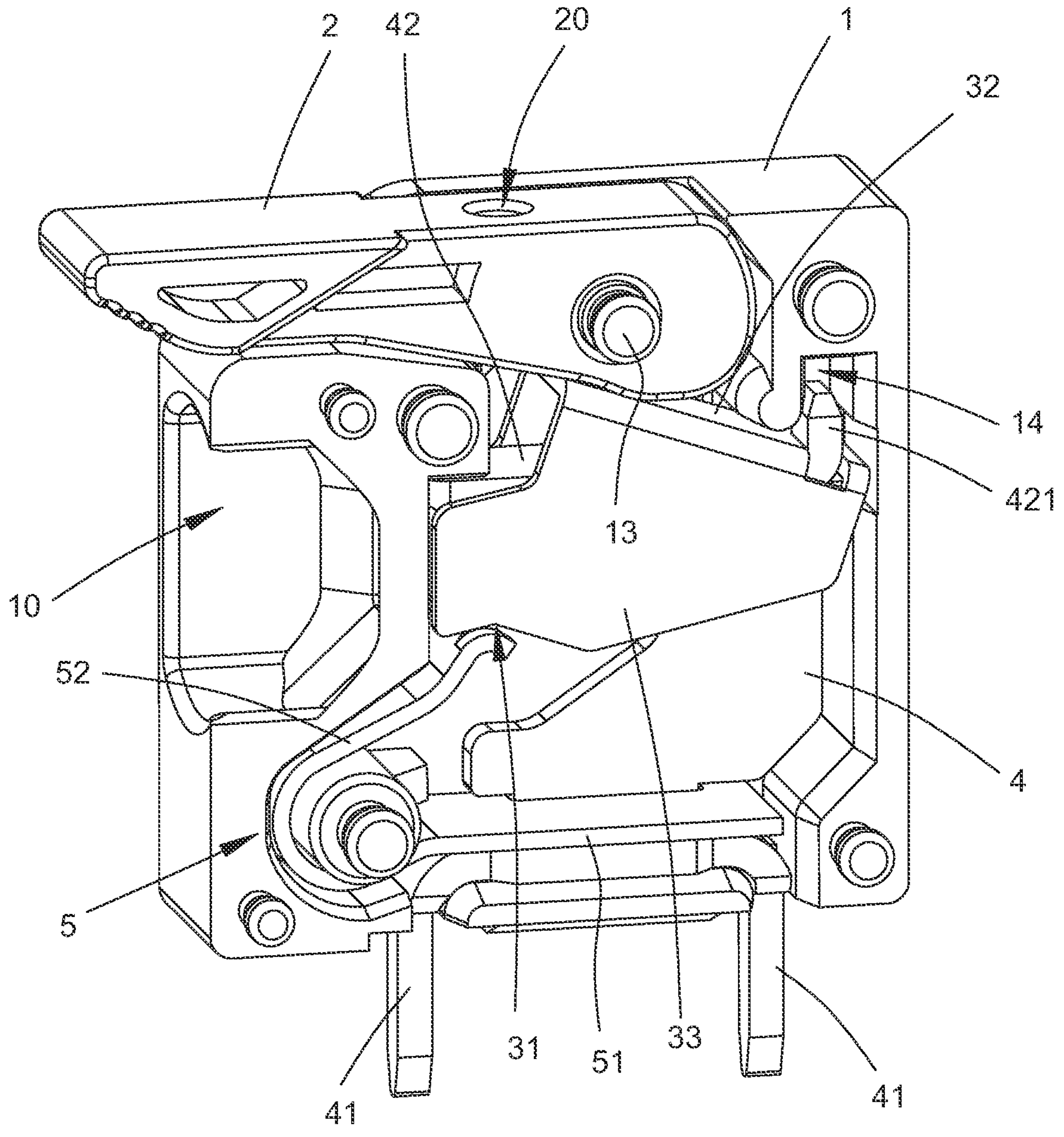
FIG. 12 is a perspective view of the wire connector according to Embodiment 2 of the present invention after the cover is removed.
Figure 13:
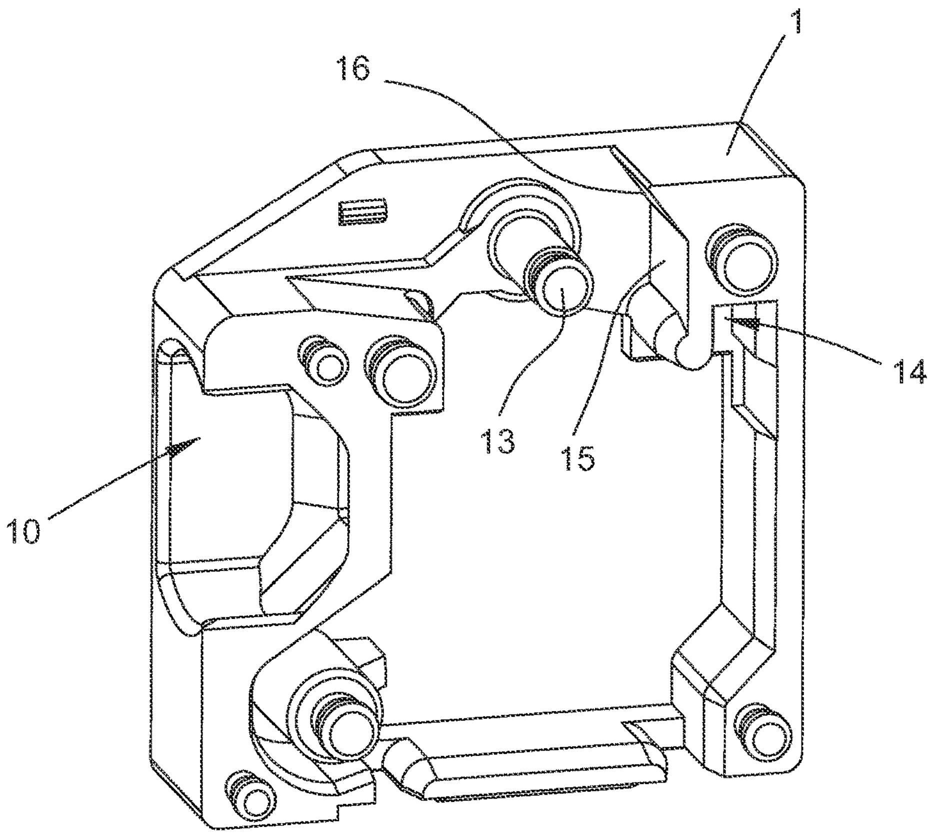
FIG. 13 is a perspective view of the insulating housing in FIG. 12.

With reference to FIGS. 10 and 11, when it is necessary to perform wiring, after a user pulls and turns up the head end 21 of the operating handle 2, the tail end 22 of the operating handle 2 will apply a pressing force to the force bearing portion 32 of the transmitting piece 3, and then the force applying portion 31 of the transmitting piece 3 presses the elastic free portion 52 of the elastic clamping piece 5 downward, so that the elastic free portion 52 is pressed down. At this time, a gap G will be formed between the elastic free portion 52 of the elastic clamping piece 5 and the electric conductor 4, so that a wire to be introduced can be inserted into the gap G.

Moreover, when the operating handle 2 is turned up and rotated to the angle defined by the rotation limiting portion, the rotation limiting portion 12 on the insulating housing 1 limits the tail end 22 of the operating handle 2, so that the operating handle 2 stays in the current state and is not easy to rotate. Consequently, the presence of the gap G can be maintained, and the user does not need to continuously apply a pulling force to the operating handle 2. Thus, the user can insert the wire into the gap G of the wire connector.

Then, the head end 21 of the operating handle 2 is pulled reversely. At this time, the force bearing portion 32 of the transmitting piece 3 is not subjected to the pressing force. Hence, the elastic free portion 52 will not be pressed down by the force applying portion 31 of the transmitting piece 3, and the elastic free portion 52 of the elastic clamping piece 5 is restored to the original state due to the resilience force. That is, the elastic free portion 52 will apply a force to the wire, so that the wire comes into electrical contact with the electric conductor 4.

When it is necessary to take out the wire, the user also pulls and turns up the operating handle 2, so that a gap G is finally formed again between the elastic free portion 52 of the elastic clamping piece 5 and the electric conductor 4. Hence, the wire can be taken out toward the outer side of the wire access hole 10. When the operating handle 2 is turned up and rotated to the angle defined by the rotation limiting portion, due to the action of the rotation limiting portion 12, the gap G will exist continuously. At this time, the user does not need to continuously apply a pulling force to the operating handle 2. Thus, the user can take out the wire in the wire connector without continuously applying a force to the operating handle 2.

To be more convenient for the user to operate the operating handle 2, with reference to FIGS. 2 and 4, in this embodiment, the rotation limiting portion 12 is a groove formed by the insulating housing 1, the rotation limiting portion 12 comprises a groove bottom 120 and an inclined wall 121 connected to the groove bottom 120; the operating handle 2 has a rotating portion 220 at the tail end 22, and the rotating portion 220 is capable of rotating inside the rotation limiting portion 12 along with the rotation of the tail end 22 of the operating handle 2. Of course, here, the rotation limiting portion 12 may also be a limiting edge. The limiting edge is formed by extending a bottom edge of the insulating housing 1 and located outside the chamber 11. The rotating portion 220 rotates in the space defined by the rotating shaft 13 and the limiting edge. In this embodiment, the rotating portion 220 is preferably of an arc-shaped structure to satisfy the smoothness of the tail end 22 of the operating handle 2 during its rotation.

Figure 6:
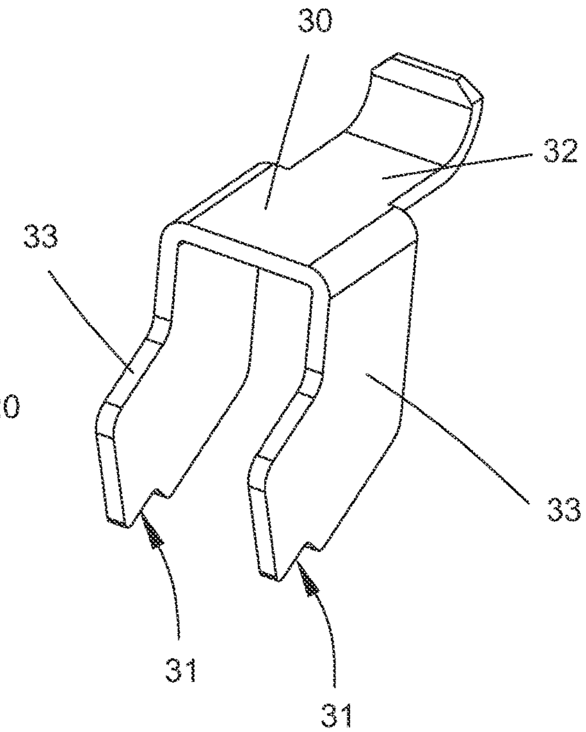
FIG. 6 is a perspective view of a transmitting piece according to Embodiment 1 of the present invention.
Figure 7:
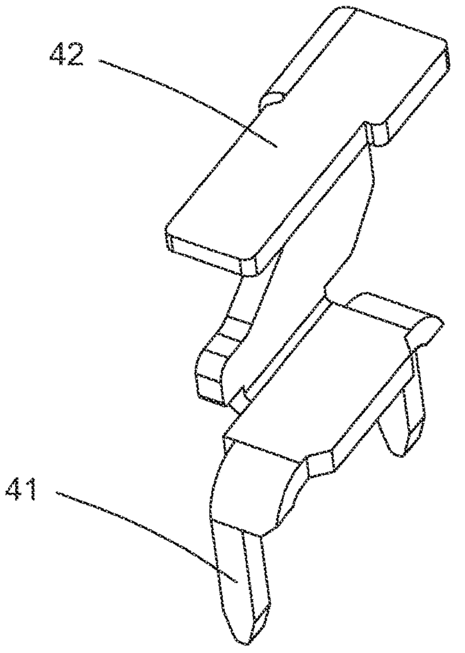
FIG. 7 is a perspective view of an electric conductor according to Embodiment 1 of the present invention.

In order to enable the transmitting piece 3 to more effectively apply a pressing force to the elastic clamping piece 5 to realize the elastic deformation of the elastic free portion 52 under stress, with reference to FIGS. 2 and 6, the transmitting piece 3 has a transmitting body 30, the force bearing portion 32 is connected to top of the transmitting body 30; the transmitting piece 3 has at least one bending arm 33 extends downwardly from the top of the transmitting body 30. Of course, in this embodiment, the transmitting piece 3 has two bending arms 33, and two force applying portions 31 are respectively formed on each bending arm 33, and the two bending arms 33 are preferably formed on two sides of the transmitting body 30 symmetrically. Of course, the two bending arms 33 may be formed on two sides of the transmitting body 30 asymmetrically.

Figure 8:
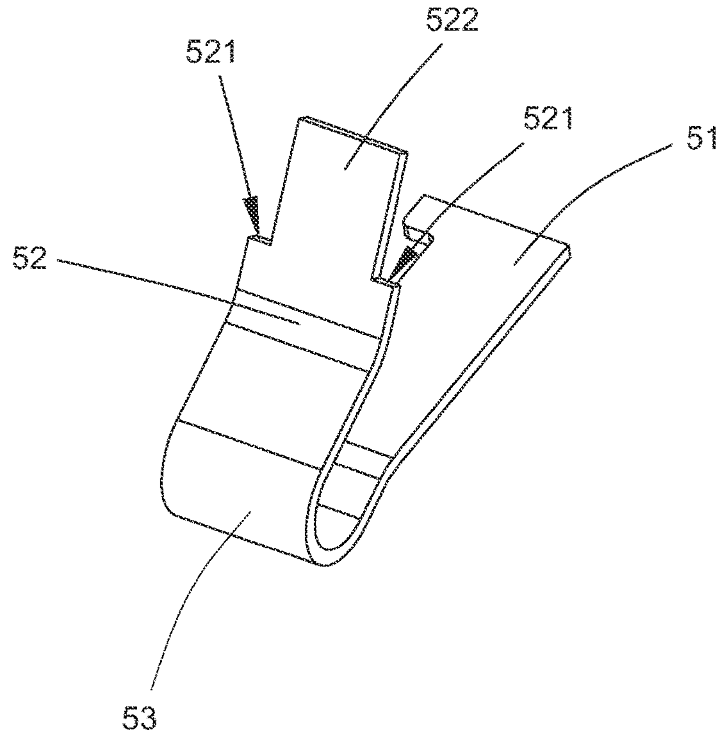
FIG. 8 is a perspective view of a first kind of an elastic clamping piece according to Embodiment 1 of the present invention.
Figure 9:
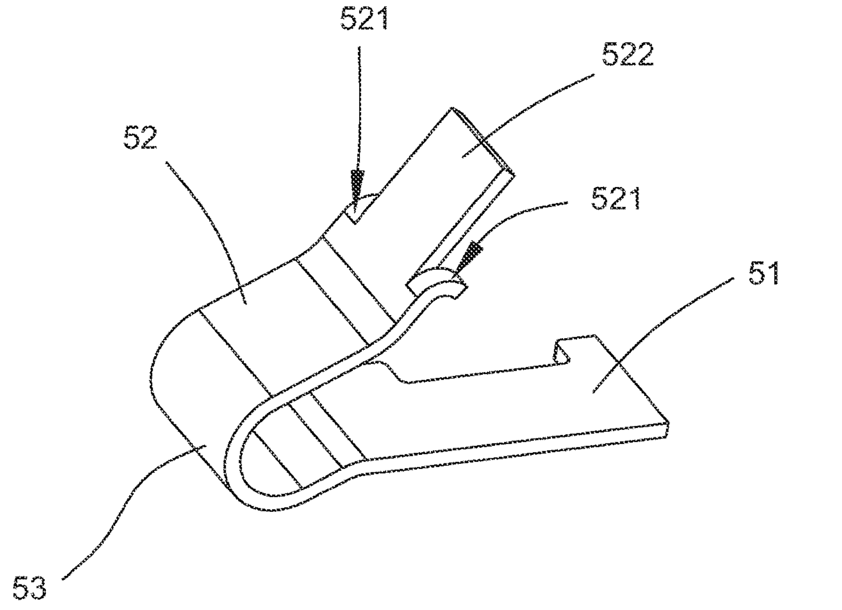
FIG. 9 is a perspective view of a second kind of the elastic clamping piece according to Embodiment 1 of the present invention.

As a mating structure for the bending arm of the transmitting piece 3, the elastic free portion 52 of the elastic clamping piece 5 comprises at least one support edge 521 on the elastic free portion 52, and at least one wire clamping edge 522 formed at an end of the elastic free portion 52;

the force applying portion 31 of the transmitting piece 3 resists against the support edge 521;

the wire clamping edge 522 allows a wire inserting through the wire access hole 10 to resist against the electric conductor 4, the fixed portion 51 and the elastic free portion 52 of the elastic clamping piece 5 is connected together through a bent transition portion 53. Here, the transition portion 53 is preferably arc-shaped, so that the elastic free portion 52 has a higher elastic deformation strength under stress to enhance the clamping force applied by the elastic free portion 52 to the wire entering the gap G. Here, the elastic clamping piece 5 may have the following two structural modes. With reference to FIG. 8, in the first kind of the elastic clamping piece 5 in this embodiment, the support edge 521 is a cross section; while with reference to FIG. 9, in the second kind of the elastic clamping piece 5, the support edge 521 is a bent edge formed by the elastic free portion 52. For example, the support edge 521 can be bent downward or upward.

In order to enable the transmitting piece 3 to effectively apply a pressing force to the elastic free portion of the elastic clamping piece 5 after it is pressed by the operating handle 2, with reference to FIGS. 6 and 10, the force bearing portion 32 of the transmitting piece 3 has a resisting end 320, the wire is capable of resisting against the upper plate 42 of the electric conductor 4, and the resisting end 320 is capable of being resisted against the upper plate 42 of the electric conductor 4 during rotation. In this embodiment, the resisting end 320 is an arc shape that is bent upward, and an accommodating groove 14 for allowing the resisting end 320 to move therein is disposed in the insulating housing 1. Correspondingly, the upper plate 42 of the electric conductor 4 is fixed inside the chamber 11 and located below the accommodating groove 14. The movement of the resisting end 320 in the accommodating groove 14 is preferably rotation, so that the transmitting piece 3 can be turned over toward the top of the insulating housing 1 due to the elastic restoring force of the elastic free portion 52.

Embodiment 2

As shown in FIGS. 12-17, a second preferred embodiment of the wire connector of the present invention is shown. This embodiment differs from the wire connector in Embodiment 1 in that: the electric conductor 4 has an upper plate 42 for contacting the wire, and a connecting portion 421 protruding upward from the upper plate 42; the transmitting piece 3 has a limiting hole 321 defined on the force bearing portion 32 for receiving the connecting portion 421, the transmitting piece 3 covers the upper plate 42, the upper plate 42 is located under the force bearing portion 32, and the connecting portion 421 extends through the limiting hole 321, so that the electric conductor 4 can be connected to the transmitting piece 3.

Figure 15:
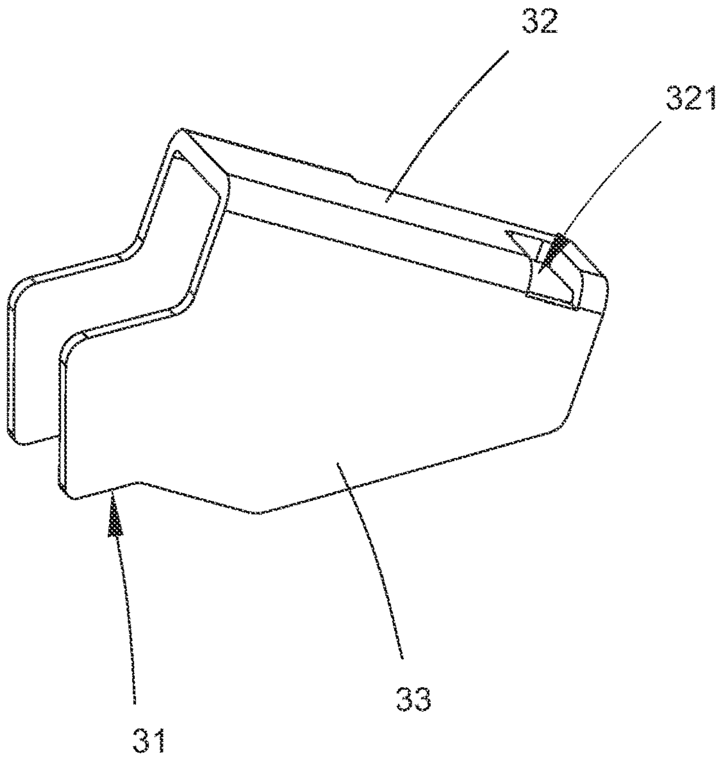
FIG. 15 is a perspective view of a first kind of the transmitting piece according to Embodiment 2 of the present invention.
Figure 16:
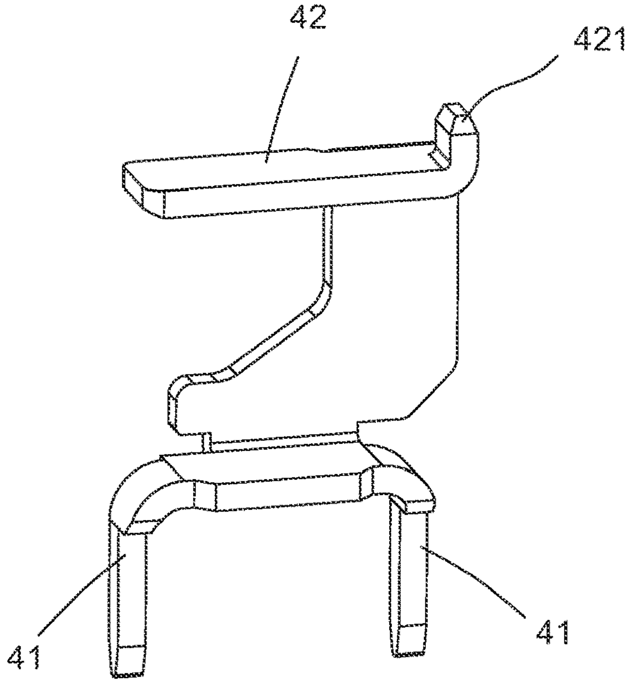
FIG. 16 is a perspective view of a first kind of the electric conductor (matched with the transmitting piece in FIG. 15) according to Embodiment 2 of the present invention.

With reference to FIGS. 15 and 16, the limiting hole 321 can be configured as a structural form with a hole, so that the connecting portion 421 can be clamped into this hole. Specifically, here, the connecting portion 421 is formed on the front surface of the upper plate 42. Correspondingly, the limiting hole 321 is formed on the front surface of the force bearing portion 32, and an accommodating groove 14 capable of accommodating the connecting portion 421 is formed on the insulating housing 1. Once the operating handle 2 is pulled and turned up, the tail end 22 of the operating handle 2 can press the force bearing portion 32, and then the transmitting piece 3 presses down the elastic clamping piece 5. At this time, the connecting portion 421 located inside the accommodating groove 14 serves as a fulcrum of rotation of the transmitting piece 3.

As a preferred arrangement mode, the limiting hole 321 is configured to be rotatably mounted to the connecting portion 421 of the electric conductor 4.

Figure 14:
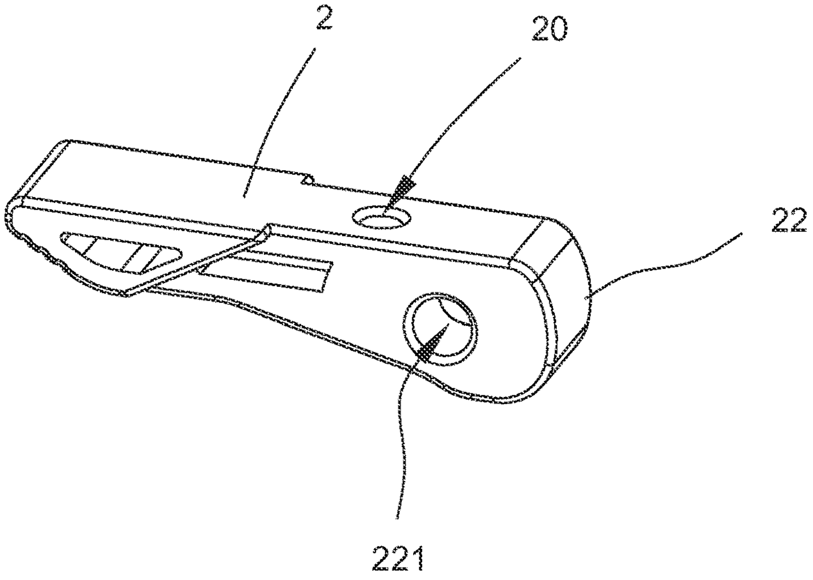
FIG. 14 is a perspective view of the operating handle in FIG. 12.

Of course, to be convenient for the user to operate by using an external electric test tool, with reference to FIG. 14, in this embodiment, the operating handle 2 has an electric test hole 20 defined on the upper plate 42. By providing the electric test hole 20, the requirement that the electric test tool resists against the upper plate 42 of the electric conductor 4 for electrical conduction testing after being inserted into the wire connector can be satisfied.

Figure 18:
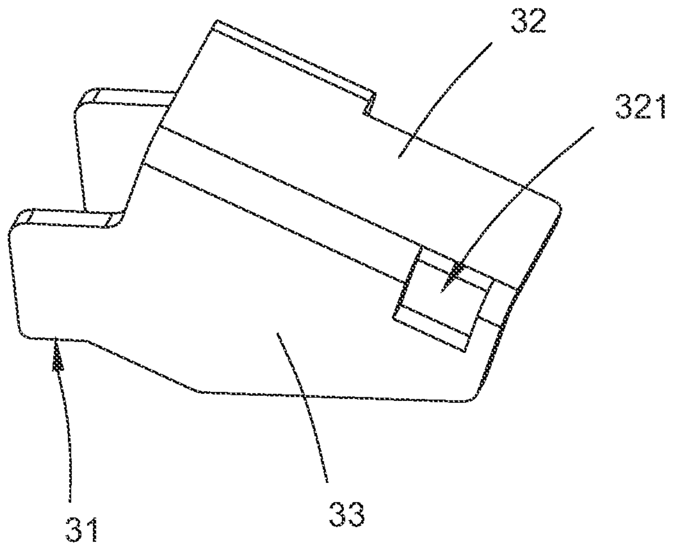
FIG. 18 is a perspective view of a second kind of the transmitting piece according to Embodiment 2 of the present invention.
Figure 19:
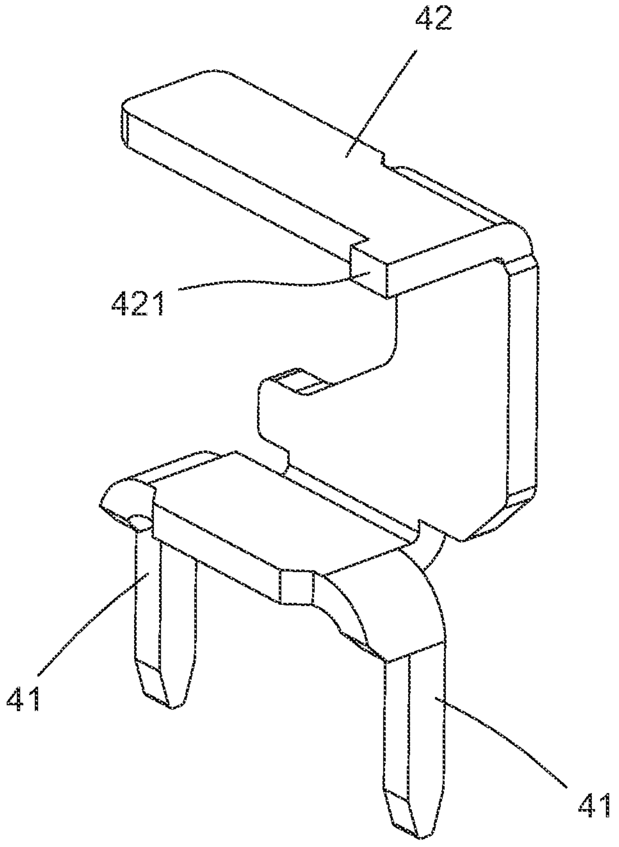
FIG. 19 is a perspective view of a second kind of the electric conductor (matched with the transmitting piece in FIG. 18) according to Embodiment 2 of the present invention.

In addition, FIGS. 18 and 19 show the second kind of the transmitting piece 3 and the second kind of the electric conductor 4 matched therewith. Specifically, the connecting portion 421 on the upper plate 42 may also be formed on one side of the upper plate 42, and correspondingly, the limiting hole 321 is formed on the other side of the force bearing portion 32. With such an arrangement, the connecting portion 421 can serve as a fulcrum of rotation of the transmitting piece 3. In this case, the structure of the wire connector (after the cover 6 is removed) is shown in FIG. 20.

Figure 17:
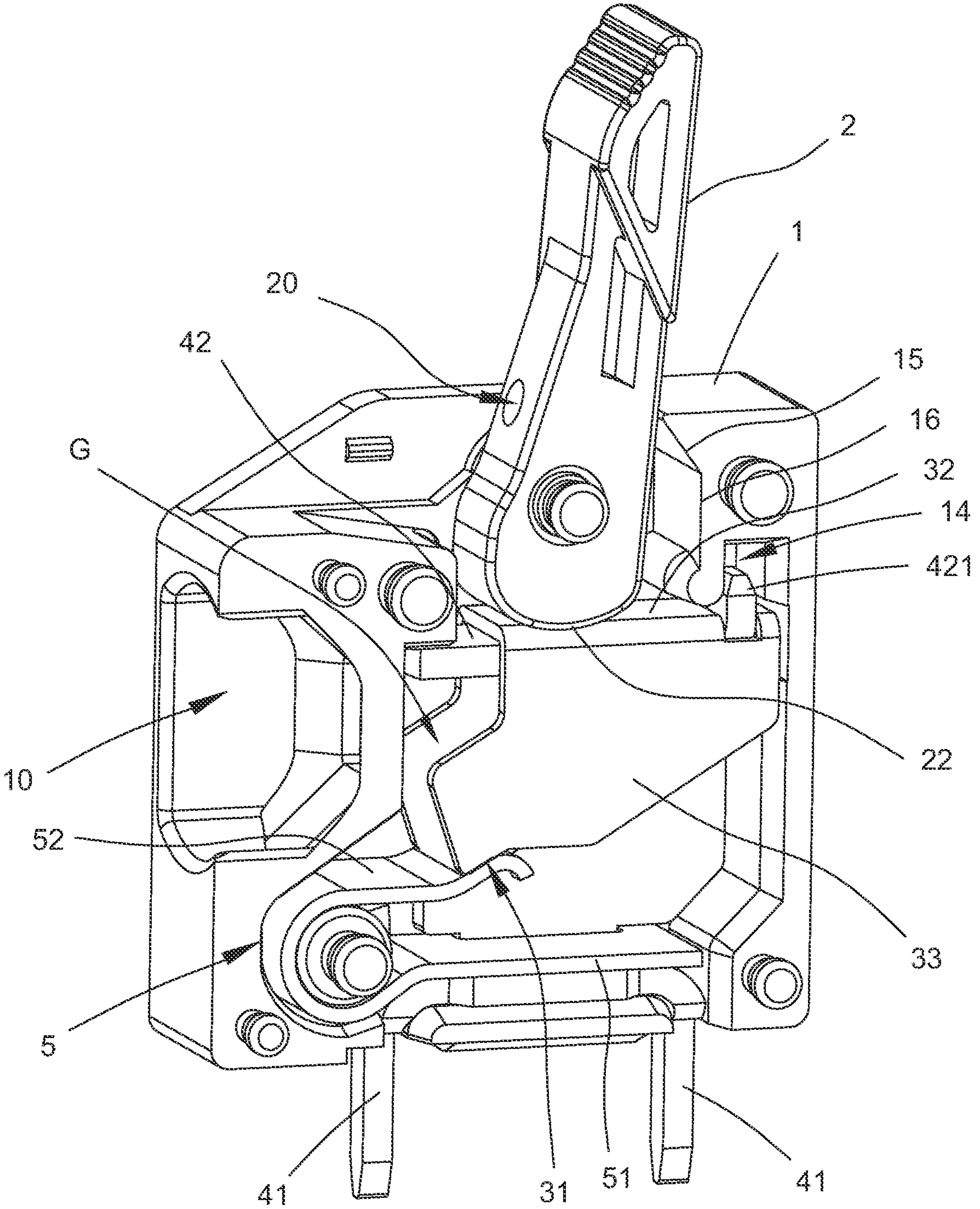
FIG. 17 is a perspective view of the wire connector in FIG. 12 when the operating handle is pulled and turned up.
Figure 20:
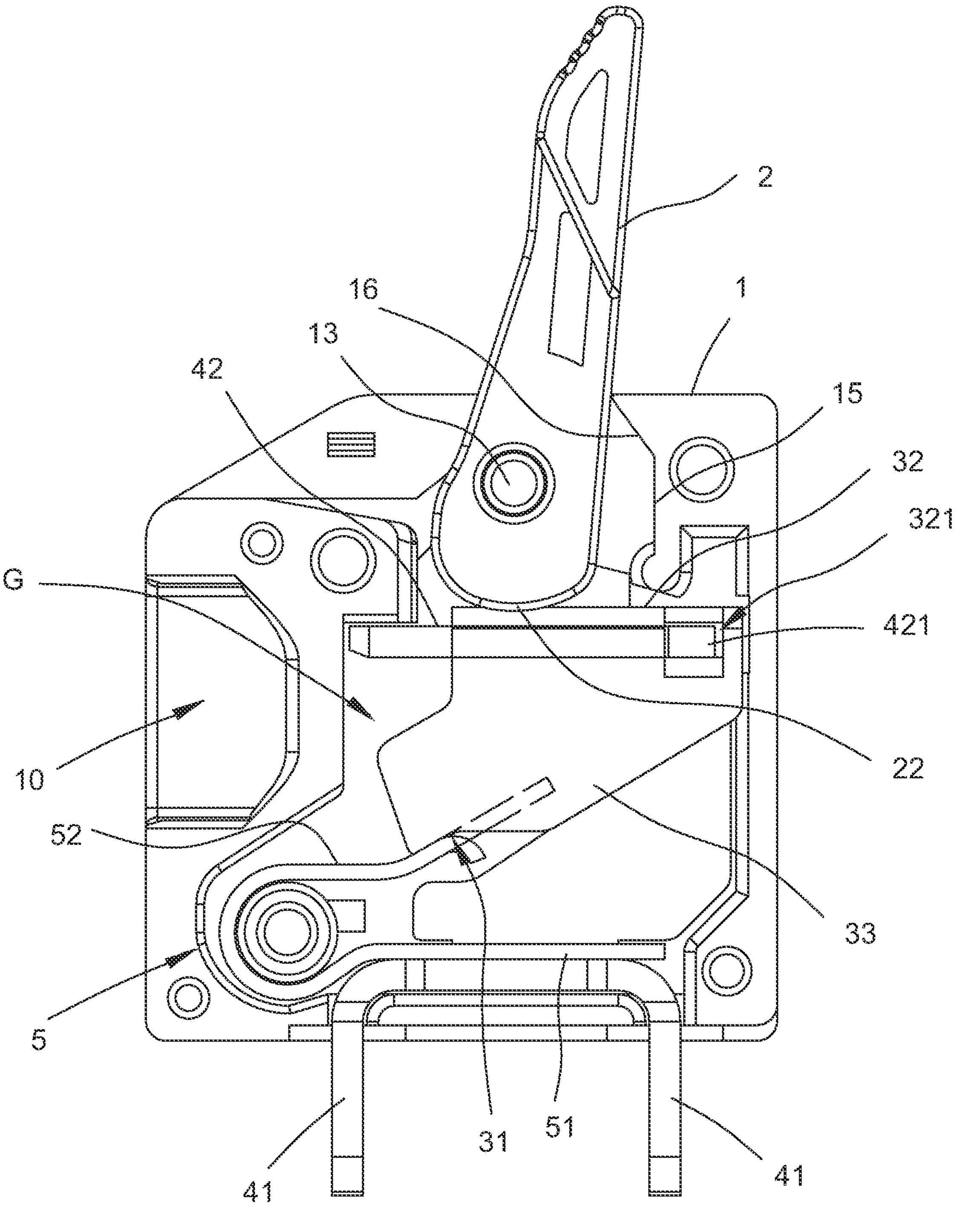
FIG. 20 is a perspective view of the wire connector with the second kind of the transmitting piece and the second kind of the electric conductor according to Embodiment 2 of the present invention when the operating handle is pulled and turned up.

It is to be noted that, with reference to FIGS. 17 and 20, a rotation limiting portion 12 for the rotation of the operating handle 2 is also provided in this embodiment. The rotation limiting portion 12 is formed by a vertical sidewall 15 formed on the insulating housing 1 and an inclined wall 16 connected to the vertical sidewall 15.

The invention claimed is:

1. An operable wire connector, comprising:

an insulating housing (1) having a wire access hole (10) and a chamber (11) in communication with the wire access hole (10);

an operating handle (2), mounted on the insulating housing (1), having a head end (21) and a tail end (22);

a transmitting piece (3), placed under the operating handle;

an electric conductor (4) placed under the transmitting piece;

an elastic clamping piece (5), mounted inside the chamber (11), with an elastic free portion (52) and a fixed portion (51); and a cover (6) assembled with the insulating housing (1) forming the chamber (11);

wherein, the head end (21) of the operating handle (2) extends outside the chamber (11) and the tail end (22) of the operating handle (2) is rotatably mounted inside the insulating housing (1);

the transmitting piece (3) has a transmitting body (30), force applying portions (31), and a force bearing portion (32) pressing against the tail end (22) of the operating handle (2), the transmitting piece (3) has a pair of bifurcated bending arms (33) extending downwardly from a top of the transmitting body (30), the force applying portions (31) are formed on the bending arms (33), and the force bearing portion (32) is connected to the top of the transmitting body (30);

the fixed portion (51) of the elastic clamping piece (5) is connected to the electric conductor (4), and the force applying portions (31) of the transmitting piece (3) resist against the elastic free portion (52); and an adjustable gap (G) is formed between the elastic free portion (52) and the electric conductor (4), for receiving a wire passing through the wire access hole (10).

2. The wire connector of claim 1, wherein the electric conductor (4) has an upper plate (42) for contacting the wire, and a connecting portion (421) protruding upward from the upper plate (42);

the transmitting piece (3) has a limiting hole (321) defined on the force bearing portion (32) for receiving the connecting portion (421), the transmitting piece (3) covers the upper plate (42), the upper plate (42) is located under the force bearing portion (32), and the connecting portion (421) extends through the limiting hole (321).

3. The wire connector of claim 2, wherein the operating handle (2) has an electric test hole (20) over the upper plate (42), for receiving an electric test tool to pass through to touch the upper plate (42).

4. The wire connector of claim 1, wherein the insulating housing (1) has a rotation limiting portion (12) for limiting a rotation angle of the tail end (22) of the operating handle (2), and the rotation limiting portion (12) is formed by a vertical sidewall (15) formed on the insulating housing (1) and an inclined wall (16) connected to the vertical sidewall (15).

5. The wire connector of claim 1, wherein the insulating housing (1) has a groove as a rotation limiting portion (12) for limiting a rotation angle of the tail end (22) of the operating handle (2);

the rotation limiting portion (12) comprises a groove bottom (120) and an inclined wall (121) connected to the groove bottom (120);

the operating handle (2) has a rotating portion (220) at the tail end (22), and the rotating portion (220) is capable of rotating inside the rotation limiting portion (12) along with the rotation of the tail end (22) of the operating handle (2).

6. The wire connector of claim 1, wherein a rotating shaft (13) is attached to the insulating housing (1) and located above the chamber (11);

a rotating shaft hole (221) for receiving the rotating shaft (13) is defined at the tail end (22) of the operating handle (2), and the tail end (22) of the operating handle (2) is rotatably connected to the insulating housing (1) by inserting the rotating shaft (13) into the rotating shaft hole (221).

7. The wire connector of claim 1, wherein the elastic free portion (52) of the elastic clamping piece (5) comprises at least one support edge (521) disposed on the elastic free portion (52), and at least one wire clamping edge (522) disposed at an end of the elastic free portion (52);

the force applying portions (31) of the transmitting piece (3) rests against the support edge (521);

the wire clamping edge (522) allows a wire inserted through the wire access hole (10) to press against the electric conductor (4), the fixed portion (51) and the elastic free portion (52) of the elastic clamping piece (5) are connected together through a bent transition portion (53).

8. The wire connector of claim 7, wherein the support edge (521) is an edge having a planar cross-section or a bent edge formed by the elastic free portion (52).

9. The wire connector of claim 1, wherein the force bearing portion (32) of the transmitting piece (3) has a resisting end (320), the wire is capable of resisting against an upper plate (42) of the electric conductor (4), and the resisting end (320) is pressed against the upper plate (42) of the electric conductor (4) during rotation.

* * * * *